(12) United States Patent
Sprouse, II et al.

(10) Patent No.: US 11,453,450 B2
(45) Date of Patent: Sep. 27, 2022

(54) BICYCLE SEAT ASSEMBLY WITH IMPROVED COMFORT AND SUPPORT

(71) Applicant: AIRHAWK INTERNATIONAL, LLC, Carlsbad, CA (US)

(72) Inventors: Anthony Eric Sprouse, II, Caseyville, IL (US); Don L. Mahoney, Carlsbad, CA (US)

(73) Assignee: AIRHAWK INTERNATIONAL, LLC, Carlsbad, CA (US)

( * ) Notice: Subject to any disclaimer, the term of this patent is extended or adjusted under 35 U.S.C. 154(b) by 0 days.

(21) Appl. No.: 17/513,524

(22) Filed: Oct. 28, 2021

(65) Prior Publication Data

US 2022/0258823 A1 Aug. 18, 2022

Related U.S. Application Data

(63) Continuation of application No. 17/210,928, filed on Mar. 24, 2021, now Pat. No. 11,173,975.

(60) Provisional application No. 63/149,768, filed on Feb. 16, 2021.

(51) Int. Cl.
 *B62J 1/10* (2006.01)
 *B62J 1/26* (2006.01)
(52) U.S. Cl.
 CPC .. *B62J 1/10* (2013.01); *B62J 1/26* (2013.01)
(58) Field of Classification Search
 CPC .................................. B62J 1/26; B62J 1/002
 USPC ................... 297/199, 219.11, 200, 204, 202
 See application file for complete search history.

(56) References Cited

U.S. PATENT DOCUMENTS

| | | | |
|---|---|---|---|
| 484,367 A | 10/1892 | Hicks | |
| 540,725 A | 6/1895 | Craig | |
| 574,342 A | 12/1896 | Ray | |
| 594,451 A | 11/1897 | Wheeler | |
| 654,720 A | 7/1900 | Englebert | |
| 2,332,847 A | 10/1943 | Franke | |
| 2,558,389 A * | 6/1951 | Robinson | B62J 1/26 297/DIG. 2 |

(Continued)

FOREIGN PATENT DOCUMENTS

| | | |
|---|---|---|
| CA | 2214760 | 7/1997 |
| CA | 2273357 | 6/1998 |

(Continued)

OTHER PUBLICATIONS

Extended Supplementary European Search Report, European Patent Application Serial No. EP 13 86 9329.6, dated Mar. 28, 2017.

(Continued)

*Primary Examiner* — Milton Nelson, Jr.
(74) *Attorney, Agent, or Firm* — Roeder & Broder LLP; James P. Broder

(57) ABSTRACT

A bicycle seat assembly that is configured to be attached to a frame of a bicycle includes a seat pan, a foam layer, and an air cell pad. The seat pan is configured to be attached to the frame of the bicycle. The seat pan includes a pair of cutouts that are spaced apart from one another. The air cell pad includes a base and a plurality of upstanding air cells that are coupled to the base, each of the plurality of air cells being configured to retain air. The foam layer can be positioned between the air cell pad and the seat pan; or the air cell pad can be positioned between the foam layer and the seat pan.

20 Claims, 9 Drawing Sheets

(56) References Cited

U.S. PATENT DOCUMENTS

| | | | |
|---|---|---|---|
| 3,756,653 A * | 9/1973 | Worley | B62J 1/08 |
| | | | 297/214 |
| 4,012,072 A | 3/1977 | Hansen | |
| 4,451,083 A | 5/1984 | Marchello | |
| 4,779,924 A | 10/1988 | Rudel | |
| 5,108,076 A | 4/1992 | Chiarella | |
| 5,165,752 A | 11/1992 | Terry | |
| 5,203,607 A | 4/1993 | Landi | |
| 5,226,188 A | 7/1993 | Liou | |
| 5,244,251 A | 9/1993 | Bourla | |
| 5,286,082 A | 2/1994 | Hanson | |
| 5,318,344 A * | 6/1994 | Wang | B62J 1/18 |
| | | | 297/214 |
| 5,348,369 A * | 9/1994 | Yu | B62J 1/00 |
| | | | 297/214 |
| 5,353,734 A | 10/1994 | Tani | |
| 5,356,205 A | 10/1994 | Calvert | |
| 5,419,612 A | 5/1995 | Rassekhi | |
| 5,461,741 A | 10/1995 | Graebe | |
| 5,658,050 A | 8/1997 | Lorbiecki | |
| 5,711,573 A | 1/1998 | Daniels et al. | |
| 5,738,406 A | 4/1998 | Deus | |
| 5,769,488 A | 6/1998 | Daniels et al. | |
| 5,904,396 A | 5/1999 | Yates | |
| 5,975,629 A | 11/1999 | Lorbiecki | |
| 6,007,149 A | 12/1999 | Yates | |
| 6,022,073 A | 2/2000 | Yates | |
| 6,027,166 A | 2/2000 | Yates | |
| 6,106,059 A | 8/2000 | Minkow | |
| 6,135,550 A | 10/2000 | Tucho | |
| 6,136,426 A | 10/2000 | Bigolin | |
| 6,231,122 B1 | 5/2001 | Goldstein | |
| 6,257,662 B1 | 7/2001 | Yates | |
| 6,345,865 B1 | 2/2002 | Ashida et al. | |
| 6,450,572 B1 | 9/2002 | Kuipers | |
| 6,598,251 B2 | 7/2003 | Habboub et al. | |
| 6,860,551 B1 | 3/2005 | Chi | |
| 6,860,552 B1 | 3/2005 | Bigolin | |
| 6,886,887 B2 | 5/2005 | Yu | |
| 6,942,291 B2 | 9/2005 | Yu | |
| 7,055,900 B2 | 6/2006 | Losio | |
| 7,121,622 B1 | 10/2006 | Mendez | |
| 7,159,936 B2 | 1/2007 | Bigolin | |
| 7,350,251 B2 | 4/2008 | Fraser et al. | |
| 7,604,292 B1 | 10/2009 | Reading | |
| 7,628,451 B2 | 12/2009 | Chuang | |
| 7,648,198 B1 | 1/2010 | Matsler | |
| 7,661,757 B2 | 2/2010 | Chuang | |
| 7,681,265 B2 | 3/2010 | Fraser | |
| 7,699,392 B2 | 4/2010 | Chuang | |
| 8,047,604 B2 | 11/2011 | Chuang | |
| D673,785 S | 1/2013 | Sprouse, II | |
| 8,851,566 B2 * | 10/2014 | Bigolin | B62J 1/24 |
| | | | 297/215 |
| 8,973,986 B1 | 3/2015 | Marceleno | |
| 9,027,992 B2 * | 5/2015 | Kawatani | B62J 1/12 |
| | | | 297/202 |
| 9,132,874 B2 | 9/2015 | Sam | |
| 9,862,441 B2 | 1/2018 | Porter | |
| 9,878,755 B2 | 1/2018 | Rouland et al. | |
| 10,399,626 B2 | 9/2019 | Perreten et al. | |
| 2003/0041379 A1 | 3/2003 | Habboub et al. | |
| 2003/0205920 A1 | 11/2003 | Sprouse, II et al. | |
| 2004/0183343 A1 | 9/2004 | Probst | |
| 2005/0121953 A1 | 6/2005 | Sprouse, II | |
| 2005/0212337 A1 | 9/2005 | Lee | |
| 2008/0196166 A1 | 8/2008 | Fraser | |
| 2012/0292958 A1 | 11/2012 | Sprouse, II | |
| 2015/0175229 A1 | 6/2015 | Chiba | |
| 2015/0183476 A1 | 7/2015 | Chiba | |
| 2019/0061850 A1 | 2/2019 | Sung | |

FOREIGN PATENT DOCUMENTS

| | | |
|---|---|---|
| CN | 212500760 U | 2/2021 |
| JP | US61075756 U | 5/1986 |
| JP | UH4093284 U | 8/1992 |
| JP | AH6344964 A | 12/1994 |
| JP | 2001138971 A * | 5/2001 |
| JP | A2003054459 A | 2/2003 |
| WO | 199408839 A1 | 4/1994 |
| WO | 9829010 A1 | 7/1998 |
| WO | 2009124105 A2 | 10/2009 |

OTHER PUBLICATIONS

International Search Report and Written Opinion for PCT/US2021/023869, issued by the ISA/US, dated Jun. 25, 2021.

* cited by examiner

BICYCLE SEAT ASSEMBLY WITH IMPROVED COMFORT AND SUPPORT

RELATED APPLICATIONS

This application is a continuation application of co-pending U.S. patent application Ser. No. 17/210,928, filed on Mar. 24, 2021, and entitled "BICYCLE SEAT ASSEMBLY WITH IMPROVED COMFORT AND SUPPORT". U.S. patent application Ser. No. 17/210,928 claims priority on U.S. Provisional Application Ser. No. 63/149,768, filed on Feb. 16, 2021, and entitled "BICYCLE SEAT ASSEMBLY WITH IMPROVED COMFORT AND SUPPORT". To the extent permitted, the contents of U.S. patent application Ser. No. 17/210,928, and U.S. Provisional Application Ser. No. 63/149,768 are incorporated in their entirety herein by reference.

BACKGROUND

In recent years, especially with the increase in popularity of electric bicycles, the number of people riding bicycles continues to increase in the United States and around the world. In addition to the number of bicycle riders increasing, often the amount of time riders spend on their bicycles has been increasing as well. Thus, with more bicycle riders spending more time riding their bicycles, it is desired to provide the bicycle rider with a bicycle seat assembly that provides improved comfort and support over the course of their rides.

SUMMARY

The present invention is directed toward a bicycle seat assembly that is configured to be attached to a frame of a bicycle. In various embodiments, the bicycle seat assembly includes a seat pan, a foam layer, and an air cell pad. The seat pan is configured to be attached to the frame of the bicycle. The seat pan includes a pair of cutouts that are spaced apart from one another. The air cell pad includes a base and a plurality of upstanding air cells that are coupled to the base, each of the plurality of air cells being configured to retain air.

In some embodiments, the foam layer is positioned between the air cell pad and the seat pan. In other embodiments, the air cell pad is positioned between the foam layer and the seat pan.

In certain embodiments, when the bicycle seat assembly is in an unstressed condition no structures are positioned within the cutouts.

In some embodiments, the bicycle seat assembly further includes a resilient layer that is positioned adjacent to the seat pan. In such embodiments, the resilient layer extends over the cutouts when the bicycle seat assembly is in the unstressed condition. In certain such embodiments, when the bicycle seat assembly is in a stressed condition, at least a portion of the resilient layer is configured to extend at least partially into the cutouts.

In one embodiment, the resilient layer includes a diaphragm that is positioned adjacent to the seat pan and extends over the pair of cutouts.

In certain embodiments, the air cells are spaced apart from one another.

In some embodiments, at least two of the air cells are in fluid communication with one another.

In certain embodiments, the air cell pad can further include a valve assembly that is selectively coupled in fluid communication to and extends between a fluid source and the plurality of air cells to selectively adjust a volume of fluid within the plurality of air cells.

In some embodiments, the bicycle seat assembly further includes a second foam layer that is positioned over the air cell pad.

In various embodiments, the bicycle seat assembly can further include a cover that covers at least a portion of the seat pan.

The present invention is further directed toward a bicycle seat assembly that is configured to be attached to a frame of a bicycle, the bicycle seat assembly including a seat pan that is configured to be attached to the frame of the bicycle, the seat pan including a pair of cutouts that are spaced apart from one another; and a resilient layer that is positioned adjacent to the seat pan, the resilient layer including a single-layered, flexible diaphragm; wherein when the bicycle seat assembly is in an unstressed condition no structures are positioned within the cutouts; wherein the resilient layer extends over the cutouts when the bicycle seat assembly is in the unstressed condition; and wherein when the bicycle seat assembly is in a stressed condition, at least a portion of the resilient layer is configured to extend at least partially into the cutouts.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a bicycle seat assembly having improved comfort and support characteristics. More particularly, the bicycle seat assembly of the present invention can include various components with various designs and configurations, which can be utilized in combination to provide a bicycle rider, or user, with a bicycle seat assembly having improved comfort and support.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
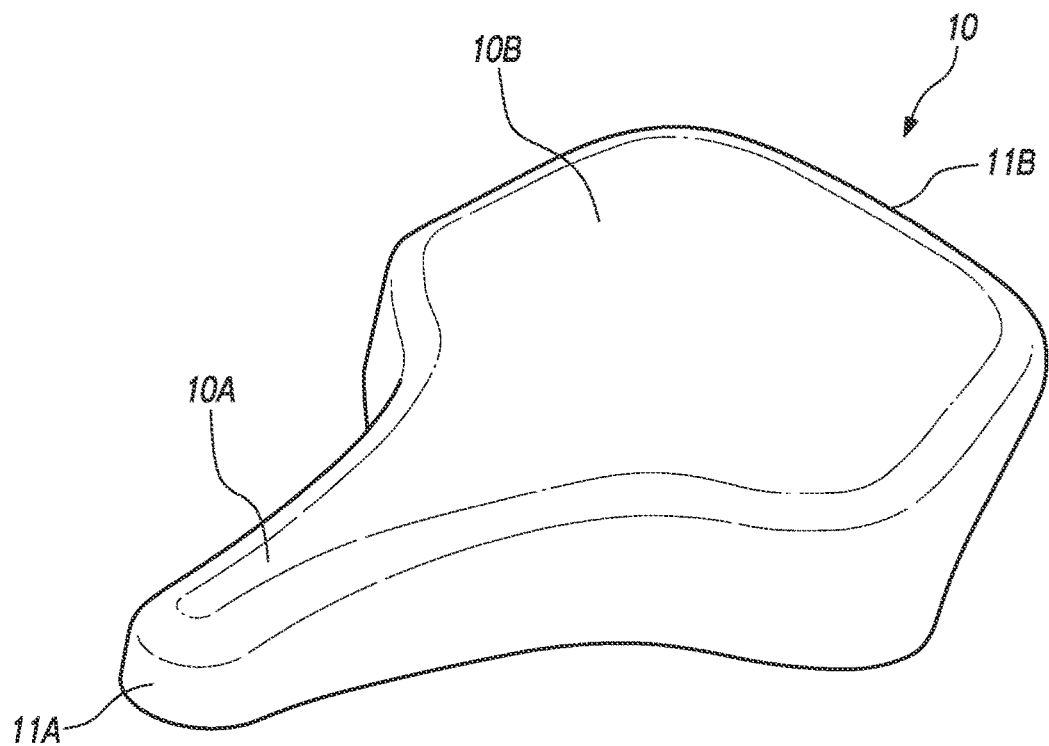
FIG. 1A is a perspective view of an embodiment of a bicycle seat assembly having features of the present invention.

FIG. 1A is a perspective view of an embodiment of a bicycle seat assembly 10 having features of the present invention. The bicycle seat assembly 10 is configured to be attached to a frame (not shown) of a bicycle (not shown) for purposes of providing desired comfort and support for a rider of the bicycle. The bicycle seat assembly 10 can be attached to the frame of the bicycle in any suitable manner. In various embodiments, the bicycle seat assembly 10 is configured to be positioned under the inner thigh, buttocks, ischial areas and/or genital area of the rider. With the designs and configurations described herein, the bicycle seat assembly 10 is able to reduce vibration and absorb shocks for the rider while riding so as to effectively inhibit potential discomfort, soreness and/or numbness in the areas such as the inner thigh, the buttocks, the ischial areas and the genital area of the rider due to pressure and vibration that can be experienced while riding a bicycle.

As illustrated, in certain embodiments, the bicycle seat assembly 10 can be somewhat teardrop-shaped, and can include a narrow, horn area 10A toward a front 11A of the bicycle seat assembly 10, and a wider, seating area 10B toward a rear 11B of the bicycle seat assembly 10. During use of the bicycle seat assembly 10, the rider will generally be seated on the seating area 10B of the bicycle seat assembly 10, but the horn area 10A will generally be positioned under the genital area of the rider. Alternatively, the bicycle seat assembly 10 can have another suitable shape.

Figure 1C:
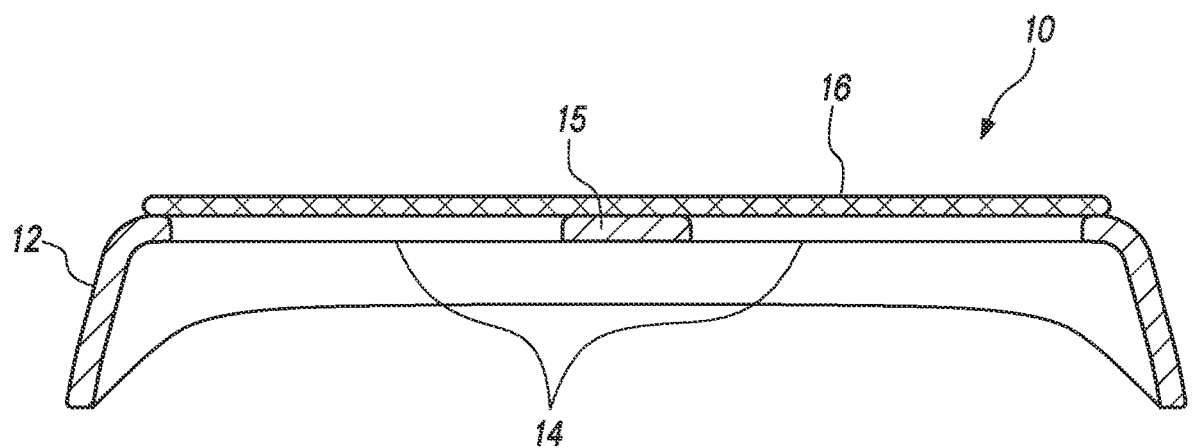
FIG. 1C is a cross-sectional view of a portion of the bicycle seat assembly taken on line C-C in FIG. 1B.
Figure 1B:
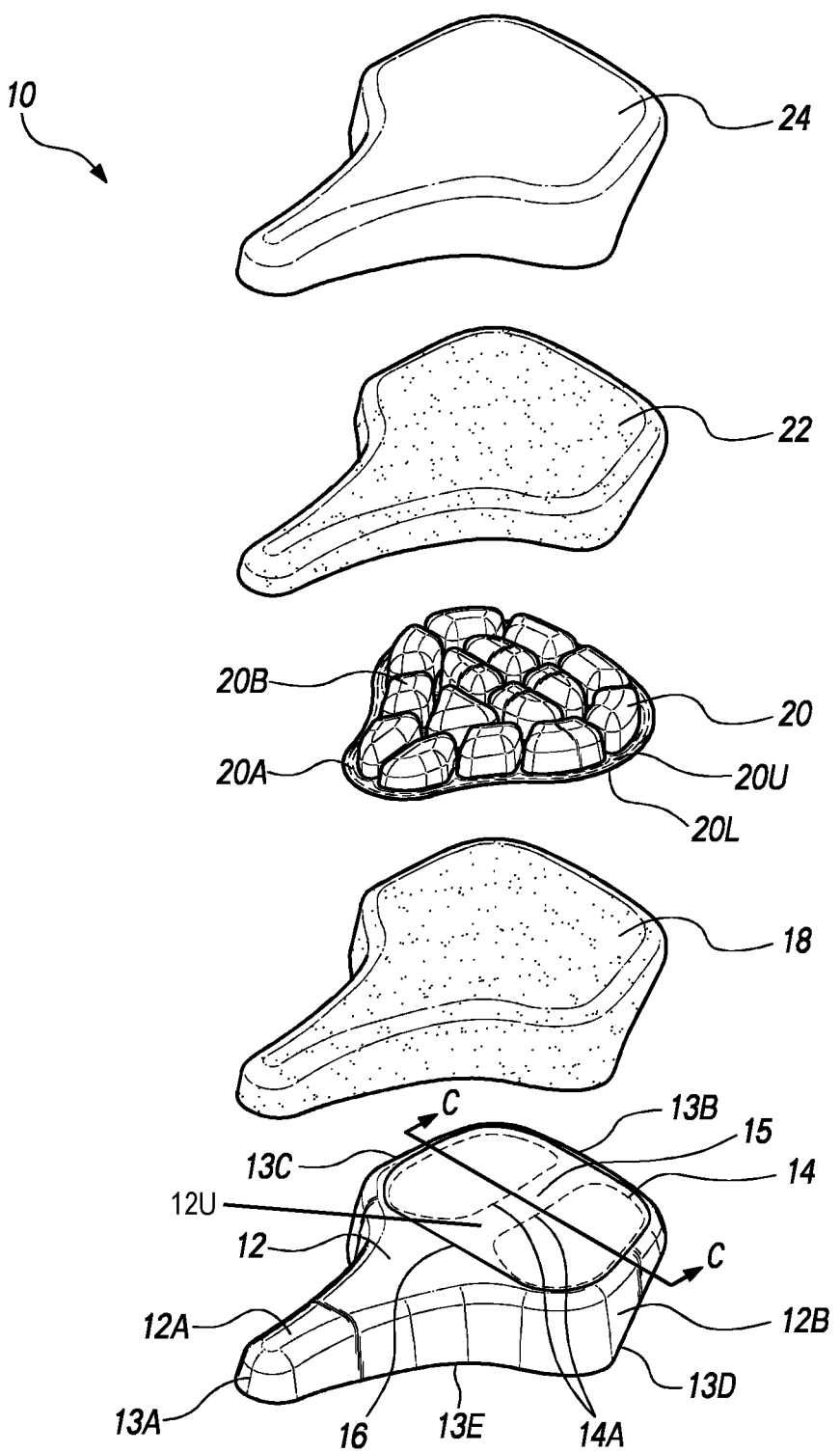
FIG. 1B is a partially exploded view of the bicycle seat assembly illustrated in FIG. 1A.

FIG. 1B is a partially exploded view of the bicycle seat assembly 10 illustrated in FIG. 1A. The design of the bicycle seat assembly 10 can be varied to suit the desired comfort and support characteristics for a user of the bicycle seat assembly 10, i.e., the rider of the bicycle. In various embodiments, the bicycle seat assembly 10 can include one or more of a seat pan 12 having a pair of cutouts 14 (illustrated in phantom); a thin, flexible resilient layer 16; a foam layer 18; an air cell pad 20; a second foam layer 22; and a cover 24. Alternatively, the bicycle seat assembly 10 can include more components or fewer components than what is illustrated and described in FIG. 1B. For example, in certain non-exclusive alternative embodiments, the bicycle seat assembly 10 can be configured without the resilient layer 16 and/or the second foam layer 22. Still alternatively, the relative positioning of the various components of the bicycle seat assembly 10 can be different than what is specifically illustrated in FIG. 1B.

In various alternative embodiments, each of the components of the bicycle seat assembly 10, i.e. the seat pan 12, the resilient layer 16, the foam layer 18, the air cell pad 20, the second foam layer 22 and the cover 24 in this particular embodiment, can be formed from any suitable materials and can be formed using any suitable manufacturing methods.

In this embodiment, the various components of the bicycle seat assembly 10 are generally positioned from bottom-to-top with the seat pan 12 at the bottom, the resilient layer positioned adjacent to and/or secured to the seat pan 12, the foam layer 18 positioned over the seat pan 12 and the resilient layer 16, the air cell pad 20 positioned on top of the foam layer 18, the second foam layer 22 positioned over the air cell pad 20, and the cover 24 positioned over the second foam layer 22, with the cover 24 also being configured to surround at least a portion of all other components of the bicycle seat assembly 10. Alternatively, in other embodiments, the relative positions of the foam layer 18, the air cell pad 20 and the second foam layer 22 can be altered relative to one another from what is shown in FIG. 1B.

As an overview, the bicycle seat assembly 10 is configured to provide desired support and comfort for the rider of the bicycle. More specifically, the cutouts 14 in the seat pan 12 are configured to provide pressure relief for the seated rider by minimizing the rigid surfaces directly beneath the buttocks and ischial areas of the rider, which is especially desired when riding for long periods of time. Additionally, the other components of the bicycle seat assembly 10, i.e., one or more of the resilient layer 16, the foam layer 18, the air cell pad 20 and the second foam layer 22, can provide resilient support for the rider, while effectively reducing the possibility of hard bottoming out for the rider, especially when riding on bumpy surfaces. The various components of the bicycle seat assembly 10 are further configured to help maintain increased blood flow for the rider, which can provide additional benefits for the rider such as longer, more pain-free rides, and which can further improve the overall cycling abilities of the rider.

The design of the seat pan 12 can be varied. As illustrated in this embodiment, the seat pan 12 can have the same general shape as the overall shape of the bicycle seat assembly 10. More particularly, as shown, the seat pan 12 can be somewhat teardrop-shaped and can include a narrow, horn area 12A toward a front 13A of the seat pan 12 and a wider, seating area 12B toward a rear 13B of the seat pan 12, which correspond with the horn area 10A (illustrated in FIG. 1A) and the seating area 10B (illustrated in FIG. 1A) of the overall bicycle seat assembly 10. It is appreciated that the size and shape of the seat pan 12, and thus the overall size and shape of the bicycle seat assembly 10, can be different than what is shown in FIG. 1B, to suit the desired support and comfort of the particular rider of the bicycle.

The cutouts 14 in the seat pan 12 are sized, shaped and oriented to be positioned at least approximately under the buttocks and/or ischial areas of the seated rider. More particularly, as shown, the seat pan 12 can include two cutouts 14, with one cutout 14 positioned on each lateral side of the seat pan 12, i.e. one cutout 14 positioned adjacent to a first lateral side 13C and the other cutout 14 positioned adjacent to a second lateral side 13D, so that each cutout 14 is positioned under one buttock and one ischial area of the rider. Additionally, as shown, the cutouts 14 can be formed into an upper surface 12U of the seating area 12B of the seat pan 12.

The actual size and shape of the cutouts 14 can be varied. In one embodiment, the cutouts 14 can be substantially flat, oval-shaped, and can be positioned to follow a general perimeter of the seating area 12B on either lateral side 13C, 13D of the seat pan 12. Alternatively, in other embodiments, the cutouts 14 can be designed with a more amorphous shape that follows the general perimeter of the seating area 12B of the seat pan 12 on either lateral side 13C, 13D of the seat pan 12. Still alternatively, the cutouts 14 can be substantially semi-circular shaped, substantially circular-shaped, substantially oval-shaped, substantially "b"-shaped, substantially "d"-shaped, substantially "p"-shaped, substantially "q"-shaped, substantially teardrop-shaped, and/or can have another suitable shape.

In many such embodiments, the cutouts 14 can have an inner edge 14A that is substantially linear such the inner edge 14A of each of the cutouts 14 is spaced apart from and substantially parallel to the inner edge 14A of the other cutout 14. Additionally, as shown, the seat pan 12 can include a narrow, bridge 15 that extends between the cutouts 14 and that is defined, at least in part, by the inner edges 14A of the cutouts 14. In some such embodiments, the bridge 15 can be substantially rectangle-shaped. Alternatively, the bridge 15 can have another suitable shape.

The seat pan 12 can be formed from any suitable materials and can be formed in any suitable manner. For example, in certain embodiments, the seat pan 12 can be formed from one or more lightweight, but rigid or semi-rigid and durable materials, such as fiberglass, plastic, aluminum, polypropylene, carbon fiber, composite, or other suitable materials. Additionally, in one non-exclusive embodiment, the seat pan 12 can be formed via injection molding, e.g., can be formed as an injection-molded plastic shell. Alternatively, the seat pan 12 can be formed by another suitable method.

The resilient layer 16 is positioned adjacent to the seat pan 12 so as to extend over and effectively cover the cutouts 14 in the base pan 12. In some embodiments, the resilient layer 16 can be adhered and/or secured to the seat pan 12. In such embodiments, the resilient layer 16 can be adhered and/or secured to the seat pan 12 in any suitable manner. Additionally, or in the alternative, the resilient layer 16 can also be adhered and/or secured to a bottom of the foam layer 18.

In one embodiment, the resilient layer 16 can include a single, thin, flexible diaphragm that is positioned adjacent to and/or adhered to the seat pan 12 in such a manner to extend over the pair of cutouts 14. Alternatively, the resilient layer 16 can include two separate thin, flexible diaphragms, with each diaphragm being positioned adjacent to and/or adhered to the seat pan 12 in such a manner to extend over a different one of the cutouts 14.

With such design, when the bicycle seat assembly 10 is in an unstressed condition (i.e. with no external forces being exerted on the bicycle seat assembly, such as with no rider being seated on the bicycle seat assembly 10), no structures, components or features of the bicycle seat assembly 10 are positioned within the cutouts 14, such that the cutouts 14 are effectively empty. Thus, in such unstressed condition, the resilient layer 16 extends over the cutouts 14, but not into the cutouts 14. Conversely, when the bicycle seat assembly 10 is in a stressed condition (i.e. with certain external forces being exerted onto the bicycle seat assembly, such as with a rider being seated on the bicycle seat assembly 10), at least a portion of the bottom-most layer above the seat pan 12 (at least the resilient layer 16 in this particular embodiment) can extend at least partially down into the cutouts 14 due to pressure from the weight of seated rider, in a somewhat hammocking manner, thus creating a hammocking effect due to inclusion of the cutouts 14. It is appreciated that in embodiments that do not include the resilient layer 16, at least the bottom-most layer above the seat pan 12, e.g., the foam layer 18 or the air cell pad 20 in some embodiments, can extend at least partially down into the cutouts 14 when the bicycle seat assembly 10 is in the stressed condition. Additionally, it is further appreciated that in any embodiments, more than just the bottom-most layer above the seat pan 12 can extend at least partially down into the cutouts 14 when the bicycle seat assembly 10 is in the stressed condition.

The resilient layer 16 can be formed from any suitable resilient material. For example, in certain non-exclusive embodiments, the resilient layer 16 can be formed from one or more of polyester, cotton-spandex, nylon, stretch velvet, knits, Lycra®, two-way stretch fabric and/or four-way stretch fabric. Alternatively, the resilient layer 16 can be formed from any other suitable resilient material.

Additionally, it is appreciated that the resilient layer 16 can be formed to have any desired thickness. For example, in some embodiments, the resilient layer 16 can have a thickness of between approximately 10 µm and 10 mm. Alternatively, the resilient layer 16 can have a thickness that is greater than approximately 10 mm or less than approximately 10 µm.

The foam layer 18 is configured to provide certain resilient support for the rider that is seated on the bicycle seat assembly 10. In this embodiment, the foam layer 18 is positioned substantially directly on top of, or over, the seat pan 12 and the resilient layer 16, and directly below the air cell pad 20. Alternatively, the foam layer 18 can be positioned in another suitable manner relative to the other components of the bicycle seat assembly 10.

As shown, the foam layer 18 can be sized and shaped to match the general overall size and shape of the seat pan 12. More particularly, in this embodiment, the foam layer 18 can be somewhat teardrop-shaped. Alternatively, the foam layer 18 can have another suitable shape.

The foam layer 18 can be formed from any suitable materials. For example, the foam layer 18 can be formed from a compressible (resilient) foam material, such as a high-density foam with shock-absorbing characteristics. Additionally, in certain alternative embodiments, the foam layer 18 can be formed from an open-celled foam material or a closed-cell foam material.

The foam layer 18 can have any suitable thickness. For example, in certain embodiments, the foam layer 18 can have a thickness of between approximately 0.25 inches and 0.75 inches. In one particular, non-exclusive embodiment, the foam layer 18 can have a thickness of approximately 0.5 inches. Alternatively, the foam layer 18 can have a thickness that is greater than 0.75 inches or less than 0.25 inches.

It is appreciated that, in this embodiment, the foam layer 18 can be secured to the seat pan 12 in any suitable manner. For example, in some non-exclusive embodiments, the foam layer 18 can be secured to the seat pan 12 with adhesive, screws, staples, rivets, hook-and-loop material, or in another suitable manner. Alternatively, in other embodiments, the foam layer 18 need not be specifically secured to the seat pan 12. More particularly, in such alternative embodiments, the foam layer 18 can be simply positioned on top of the seat pan 12 and the foam layer 18 can maintain its position relative to the seat pan 12 due to the presence of the cover 24 that can extend at least partially around each of the seat pan 12 and the foam layer 18 (and the air cell pad 20 and the second foam layer 22, as well).

The air cell pad 20 is also configured to provide certain resilient support for the rider that is seated on the bicycle seat assembly 10. In this embodiment, the air cell pad 20 is positioned substantially directly on top of, or over, the foam layer 18, and directly below the second foam layer 22. Alternatively, the air cell pad 20 can be positioned in another suitable manner relative to the other components of the bicycle seat assembly 10.

As shown, the air cell pad 20 can have a size and shape that matches the general overall shape of at least the seating area 12B of the seat pan 12. In some embodiments, the air cell pad 20 can also be sized and shaped to extend over all or a portion of the horn area 12A of the seat pan 12.

The air cell pad 20 can have any suitable design and/or can be made from any suitable materials. In some embodiments, such as shown in FIG. 1B, the air cell pad 20 can include a base 20A and a plurality of upstanding air cells 20B that are mounted onto and/or coupled to the base 20A. In certain such embodiments, the air cells can be mounted onto and/or coupled to an upper surface 20U (or top surface) of the base. Each of the plurality of air cells 20B is configured to retain air so as to provide resilient support for the rider when the rider is seated on the bicycle seat assembly 10.

In some embodiments, the air cells 20B can be spaced apart at least slightly from one another to provide external airflow pathways between air cells 20B in a manner to allow air to flow between the air cells 20B to help disperse heat and moisture.

In certain embodiments, one or more of the air cells 20B can be interconnected to one another by fluid flow channels (not shown) to place the interconnected air cells 20B in fluid communication with one another. With such design, the interconnected air cells 20B enable equalized pressure among the air cells 20B so as to provide enhanced weight distribution. In some such embodiments, multiple groups of air cells 20B can be interconnected with one another, while being isolated from the other groups, so as to provide different regions of support with desired support characteristics. In one embodiment, the fluid flow channels can be formed into the base 20A of the air cell pad 20. Alternatively, the fluid flow channels can be formed on a surface, e.g., the upper surface 20U or a lower surface 20L (or bottom surface), of the base 20A.

It is appreciated that with the more equalized pressure between the air cells 20B, the pressure from the seated rider would be spread over a wider area so as to reduce isolated pressure points for the seated rider. Additionally, as the seated rider alters their position on the bicycle seat assembly 10, the weight distribution through the interconnected air cells 20B will also change and adjust to the specific anatomy and positioning of the seated rider to provide a more comfortable ride while reducing the noted pressure points.

It is further appreciated that by enabling constant, fluid-air communication between the air cells 20B, the bicycle seat assembly 10 can better maintain increased blood flow for the rider, which can provide various benefits to the cycling ability of the rider, such as by enabling longer, more pain-free rides.

In some embodiments, the air cell pad 20 can also be configured such that the air pressure and/or the air volume within the air cells 20B can be varied and/or adjusted as desired. Stated in another manner, the air pressure and/or the air volume within the air cells 20B can be selectively adjusted to suit the specific needs of the rider of the bicycle, e.g., based on the specific size, shape and/or weight of the rider. It is appreciated that such air pressure/air volume adjustments can be made to apply for individual air cells 20B, for certain groups of air cells 20B, and/or collectively for all of the air cells 20B. For example, in some such embodiments, the air cell pad 20 can include a valve assembly 826 (illustrated in FIG. 8A) that can be selectively coupled in fluid communication with a fluid source 828 (illustrated in FIG. 8A), such as an air source, so as to enable the air pressure and/or air volume within the air cells 20B to be raised or lowered as desired. Alternatively, the adjustability of the air pressure and/or air volume within the air cells 20B can be accomplished in another suitable manner.

The air cell pad 20, i.e., the base 20A and/or the air cells 20B, can be formed from any suitable materials. For example, in one embodiment, the air cell pad 20 can be formed at least in part from dip-molded neoprene to provide enhanced support characteristics. Alternatively, in other embodiments, the air cell pad 20 can be formed from a flexible elastomeric material, a vacuum-molded thermoplastic material, or another suitable material. It is appreciated that the air cell pad 20, including the base 20A and the air cells 20B, can be manufactured using any suitable manufacturing methods.

Additionally, the air cells 20B can be configured to be any suitable shape, and the air cells 20B can all have the same general shape or one or more of the air cells 20B can have different shapes from one another. In certain non-exclusive alternative embodiments, one or more of the air cells 20B can be substantially rectangle-shaped, square-shaped, oval-shaped, circle-shaped, semicircle-shaped, trapezoid-shaped, diamond-shaped, triangle-shaped, pentagon-shaped, or hexagon-shaped. Alternatively, one or more of the air cells 20B can have another suitable shape.

Still alternatively, in some embodiments, the air cell pad 20 can be provided in the form of, and/or can be replaced by, gel pads, gel-filled cellular pads, or other types of resilient support pads.

The second foam layer 22 is also configured to provide certain resilient support for the rider that is seated on the bicycle seat assembly 10. Additionally, in certain embodiments, the second foam layer 22 (or potentially the foam layer 18) can be positioned on top of the air cell pad 20 to improve the aesthetic appearance of the bicycle seat assembly 10. Stated in another manner, the second foam layer 22 (or potentially the foam layer 18) can cover the somewhat bumpy appearance that may otherwise be visible through the cover 24 due to the air cell pad 20. In this embodiment, the second foam layer 22 is positioned substantially directly on top of, or over, the air cell pad 20 and below the cover 24. Alternatively, the second foam layer 22 can be positioned in another suitable manner relative to the other components of the bicycle seat assembly 10.

As shown, the second foam layer 22 can be sized and shaped to match the general overall size and shape of the seat pan 12. More particularly, in this embodiment, the second foam layer 22 can be somewhat teardrop-shaped. Alternatively, the second foam layer 22 can have another suitable shape.

The second foam layer 22 can be formed from any suitable materials. For example, the second foam layer 22 can be formed from a compressible (resilient) foam material, such as a high-density foam with shock-absorbing characteristics. Additionally, in certain alternative embodiments, the second foam layer 22 can be formed from an open-celled foam material or a closed-cell foam material.

The second foam layer 22 can have any suitable thickness. For example, in certain embodiments, the second foam layer 22 can have a thickness of between approximately 0.125 inches and 0.375 inches. In one particular, non-exclusive embodiment, the second foam layer 22 can have a thickness of approximately 0.25 inches. Alternatively, the second foam layer 22 can have a thickness that is greater than 0.375 inches or less than 0.125 inches.

It is appreciated that the second foam layer 22 can be secured to the other components of the bicycle seat assembly 10 in any suitable manner. For example, in some non-exclusive embodiments, the second foam layer 22 can be secured to another component of the bicycle seat assembly 10 with adhesive, screws, staples, rivets, hook-and-loop material, or in another suitable manner. Alternatively, in other embodiments, the second foam layer 22 can be simply positioned on top of the air cell pad 20, and the second foam layer 22 can maintain its position relative to the other components due to the presence of the cover 24 that can extend at least partially around each of the other components of the bicycle seat assembly 10.

The cover 24 is configured to provide a protective covering for the other components of the bicycle seat assembly 24. More particularly, the cover 24 can be positioned to extend around and cover at least a portion of all of the other components of the bicycle seat assembly 10, i.e. the seat pan 12, the resilient layer 16, the foam layer 18, the air cell pad 20 and the second foam layer 22 in this embodiment. Additionally, the cover 24 is further configured to provide a comfortable surface upon which the rider can sit when riding on the bicycle. The cover 24 can also be utilized to enhance the aesthetic appearance of the bicycle seat assembly 10.

The cover 24 can include and/or be formed from any suitable materials. In some embodiments, the cover 24 can include and/or be formed at least in part from leather, plastic, vinyl, Lycra®, or a fabric material. Additionally, in certain embodiments, the cover 24 can include a moisture-repellant spacer fabric that allows airflow and wicking characteristics to reduce moisture buildup at an interface of the rider and the cover 24. In some embodiments, different portions of the cover 24 can be formed from different materials. For example, in certain such embodiments, a top surface of the cover 24 can be formed from a moisture-repellant spacer fabric, and side walls of the cover 24 can be formed from leather, plastic, vinyl, Lycra®, or a stretchy fabric material. Alternatively, the cover 24 can be formed from any other suitable materials.

As noted, the cover 24 can be positioned to extend around and cover at least a portion of all of the other components of the bicycle seat assembly 10, i.e., the seat pan 12, the resilient layer 16, the foam layer 18, the air cell pad 20 and the second foam layer 22 in this embodiment. In various embodiments, the cover 24 can be connected to a bottom surface 13E of the seat pan 12 in any suitable manner, i.e., with any suitable type of cover connection assembly (not shown). For example, in one such embodiment, the cover 24 can include a band of elastic material around a bottom of the cover 24 to effectively secure the cover 24 about the other components of the bicycle seat assembly 10. Alternatively, the cover attachment assembly can include individual attachment members that are configured to engage one another when the cover 24 is being secured around the other components of the bicycle seat assembly 10. For example, in such alternative embodiment, the cover 24 can include one or more first attachment members near a bottom edge of the cover 24, and the seat pan 12 can include one or more second attachment members along the bottom surface 13E of the seat pan 12, with each of the first attachment members being configured to engage one of the second attachment members as the cover 24 is being secured around the other components of the bicycle seat assembly 10. Still alternatively, the cover connection assembly can include screws, staples, rivets, hook-and-loop material, heat-sealing adhesives, or other suitable connection means.

FIG. 1C is a cutaway view of a portion of the bicycle seat assembly 10 of FIG. 1B taken on line C-C. In particular, FIG. 1C is a cutaway view of the seat pan 12 and the resilient member 16 of the bicycle seat assembly 10. As illustrated, the seat pan 12 includes the pair of cutouts 14 with the bridge 15 positioned therebetween, and the resilient member 16 is positioned adjacent to the seat pan 12. In this embodiment, the resilient member 16 is configured to extend over both of the cutouts 14 that are formed into the seat pan 12, i.e. when the bicycle seat assembly 10 is in the unstressed condition.

Figure 2:
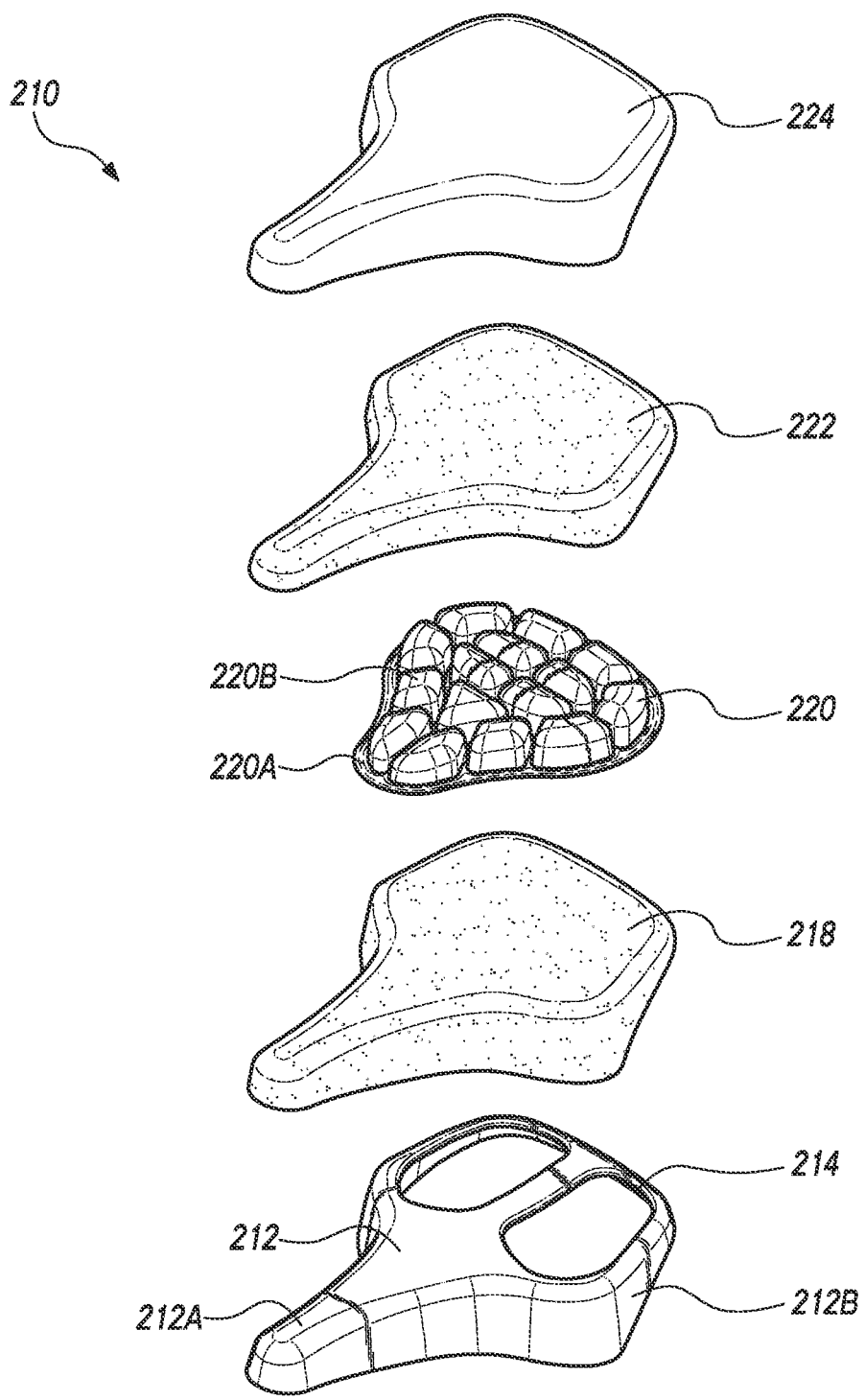
FIG. 2 is an exploded view of another embodiment of the bicycle seat assembly.

FIG. 2 is an exploded view of another embodiment of the bicycle seat assembly 210. As with the previous embodiment, the bicycle seat assembly 210 is again configured to provide improved support and comfort for the rider of the bicycle.

As illustrated, the bicycle seat assembly 210 is substantially similar to what has been illustrated and described relative to the embodiment shown in FIG. 1B. For example, the bicycle seat assembly 210 again includes a seat pan 212 including a horn area 212A, a seating area 212B, and a pair of cutouts 214 that are formed into the seating area 212B; a foam layer 218; an air cell pad 220 including a base 220A and a plurality of air cells 220B that are mounted on and/or secured to the base 220A; a second foam layer 222; and a cover 224, which are substantially similar in design and functionality as what has been described in detail herein above. Additionally, the components of the bicycle seat assembly 210 are again generally positioned from bottom-to-top, with the seat pan 212 at the bottom, the foam layer 218 positioned on top of, or over, the seat pan 212, the air cell pad 220 positioned on top of, or over the foam layer 218, the second foam layer 222 positioned on top of the air cell pad, 220, and the cover 224 positioned on top of, or over, the second foam layer 222 while also being configured to surround at least a portion of all other components of the bicycle seat assembly 210.

However, in this embodiment, the bicycle seat assembly 210 is configured without the resilient layer that can be positioned adjacent to and/or adhered to the seat pan 212 and can be positioned to cover the cutouts 214 in the seat pan 212.

Figure 3:
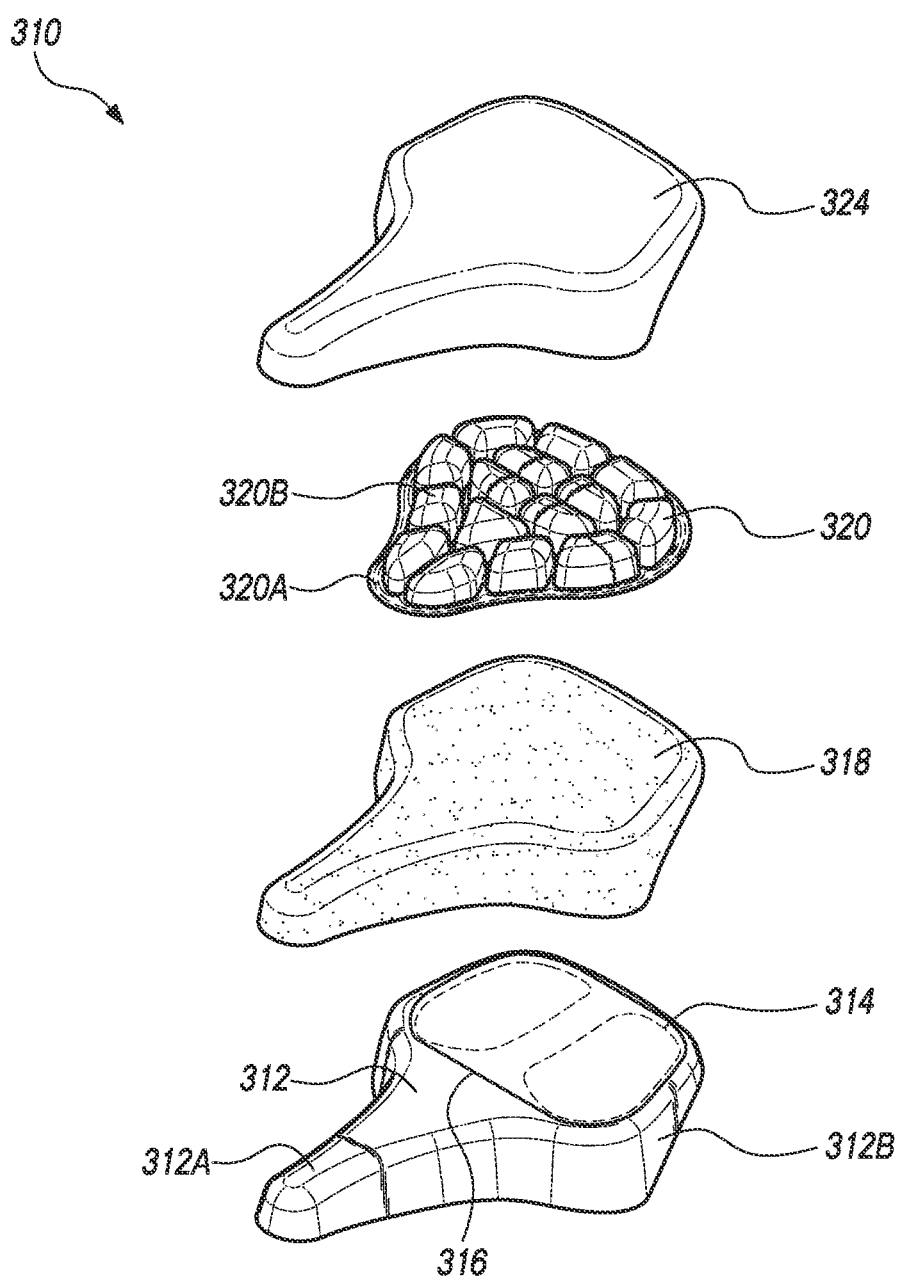
FIG. 3 is a partially exploded view of still another embodiment of the bicycle seat assembly.

FIG. 3 is a partially exploded view of still another embodiment of the bicycle seat assembly 310. As with the previous embodiments, the bicycle seat assembly 310 is again configured to provide improved support and comfort for the rider of the bicycle.

As illustrated, the bicycle seat assembly 310 is substantially similar to what has been illustrated and described relative to the embodiment shown in FIG. 1B. For example, the bicycle seat assembly 310 again includes a seat pan 312 including a horn area 312A, a seating area 312B, and a pair of cutouts 314 (illustrated in phantom) that are formed into the seating area 312B; a resilient layer 316 that is positioned adjacent to and/or adhered to the seat pan 312 and is configured to cover the cutouts 314 in the seat pan 312; a foam layer 318; an air cell pad 320 including a base 320A and a plurality of air cells 320B that are mounted on and/or secured to the base 320A; and a cover 324, which are substantially similar in design and functionality as what has been described in detail herein above. Additionally, the components of the bicycle seat assembly 310 are generally positioned from bottom-to-top, with the seat pan 312 at the bottom, the resilient layer 316 being positioned adjacent to and/or adhered to the seat pan 312, the foam layer 318 positioned on top of, or over, the seat pan 312 and the resilient layer 316, the air cell pad 320 positioned on top of the foam layer 318, and the cover 324 positioned on top of, or over, the air cell pad 320 while also being configured to surround at least a portion of all other components of the bicycle seat assembly 310.

However, in this embodiment, the bicycle seat assembly 310 is configured without the second foam layer that can be positioned on top of the air cell pad 320.

Figure 4:
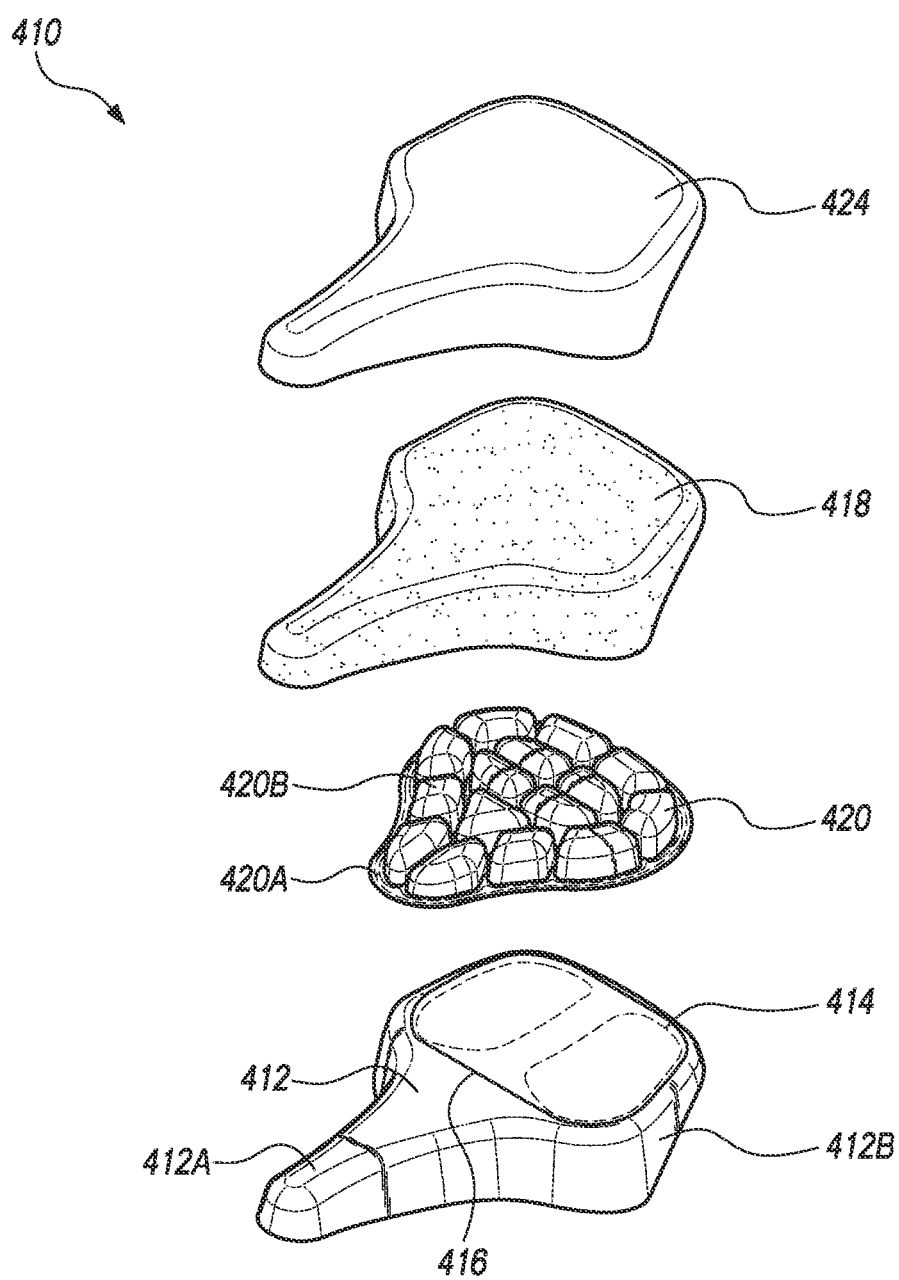
FIG. 4 is a partially exploded view of another embodiment of the bicycle seat assembly.

FIG. 4 is a partially exploded view of another embodiment of the bicycle seat assembly 410. As with the previous embodiments, the bicycle seat assembly 410 is again configured to provide improved support and comfort for the rider of the bicycle.

As illustrated, the bicycle seat assembly 410 is substantially similar to what has been illustrated and described relative to the embodiment shown in FIG. 3. For example, the bicycle seat assembly 410 again includes a seat pan 412 including a horn area 412A, a seating area 412B, and a pair of cutouts 414 (illustrated in phantom) that are formed into the seating area 412B; a resilient layer 416 that is positioned adjacent to and/or adhered to the seat pan 412 and is configured to cover the cutouts 414 in the seat pan 412; a foam layer 418; an air cell pad 420 including a base 420A and a plurality of air cells 420B that are mounted on and/or secured to the base 420A; and a cover 424, which are substantially similar in design and functionality as what has been described in detail herein above.

However, in this embodiment, the relative positions of the foam layer 418 and the air cell pad 420 have been switched from what was illustrated and described in the embodiment of FIG. 3. More specifically, in this embodiment, the components of the bicycle seat assembly 410 are generally positioned from bottom-to-top, with the seat pan 412 at the bottom, the resilient layer 416 being positioned adjacent to and/or adhered to the seat pan 412, the air cell pad 420 positioned on top of, or over, the seat pan 412 and the resilient layer 416, the foam layer 418 positioned on top of, or over, the air cell pad 420, and the cover 424 positioned on top of, or over, the foam layer 418 while also being configured to surround at least a portion of all other components of the bicycle seat assembly 410.

Figure 5:
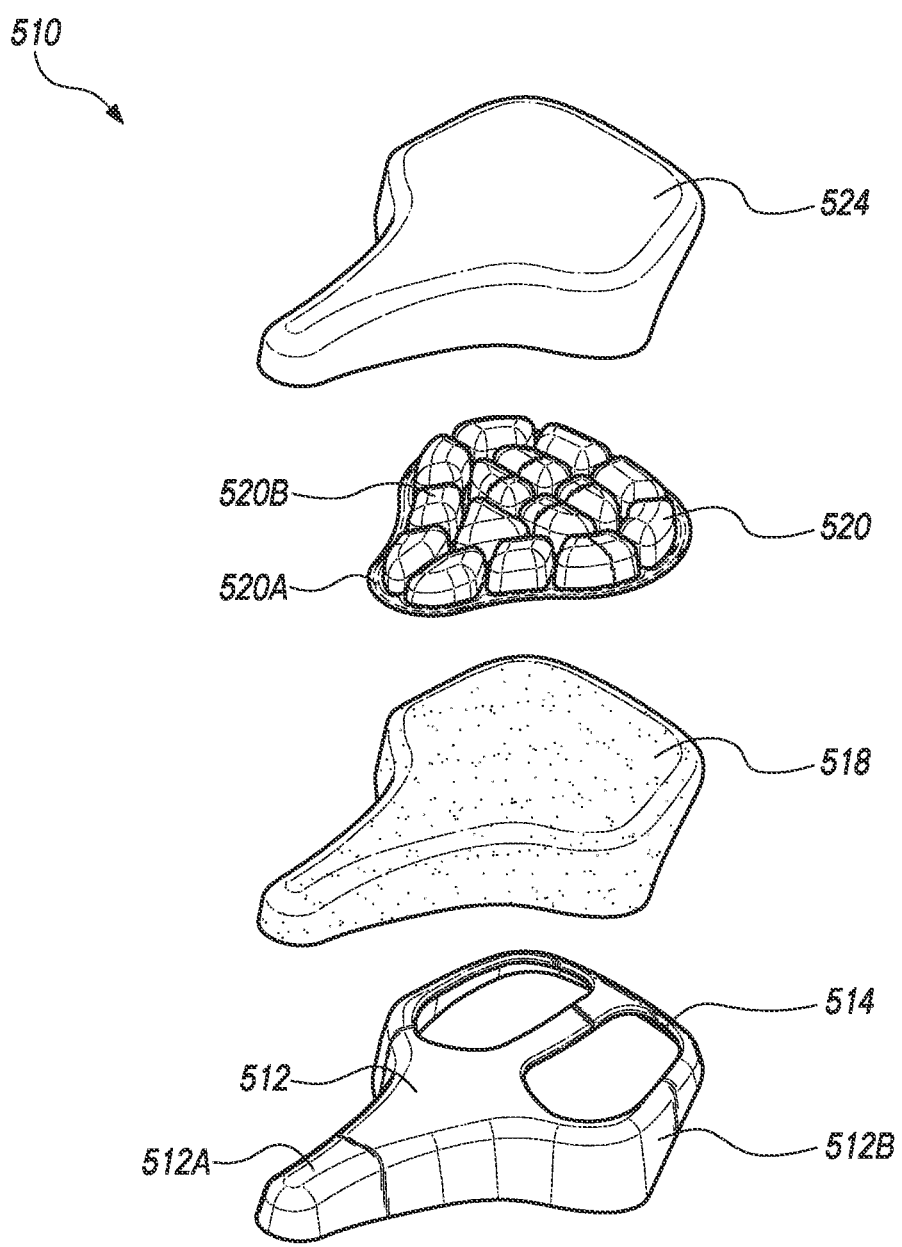
FIG. 5 is an exploded view of yet another embodiment of the bicycle seat assembly.

FIG. 5 is an exploded view of yet another embodiment of the bicycle seat assembly 510. As with the previous embodiments, the bicycle seat assembly 510 is again configured to provide improved support and comfort for the rider of the bicycle.

As illustrated, the bicycle seat assembly 510 is substantially similar to what has been illustrated and described relative to the embodiment shown in FIG. 3. For example, the bicycle seat assembly 510 again includes a seat pan 512 including a horn area 512A, a seating area 512B, and a pair of cutouts 514 that are formed into the seating area 512B; a foam layer 518; an air cell pad 520 including a base 520A and a plurality of air cells 520B that are mounted on and/or secured to the base 520A; and a cover 524, which are substantially similar in design and functionality as what has been described in detail herein above. Additionally, the components of the bicycle seat assembly 510 are generally positioned from bottom-to-top, with the seat pan 512 at the bottom, the foam layer 518 positioned on top of, or over, the seat pan 512, the air cell pad 520 positioned on top of, or over, the foam layer 518, and the cover 524 positioned on top of, or over, the air cell pad 520 while also being configured to surround at least a portion of all other components of the bicycle seat assembly 510.

However, in this embodiment, the bicycle seat assembly 510 is configured without the resilient layer that can be positioned adjacent to and/or adhered to the seat pan 512 and can be positioned to cover the cutouts 514 in the seat pan 512.

Figure 6:
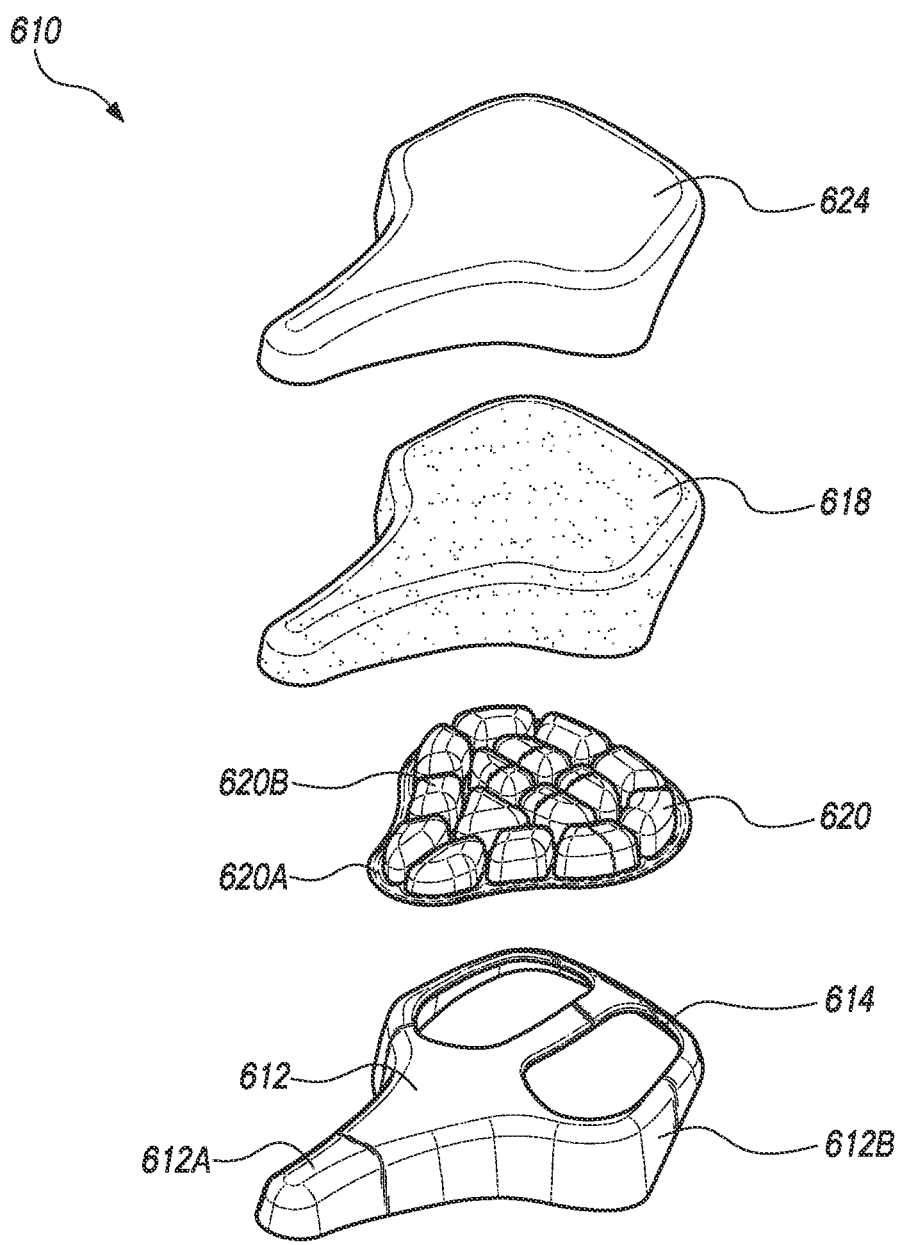
FIG. 6 is an exploded view of another embodiment of the bicycle seat assembly.

FIG. 6 is an exploded view of another embodiment of the bicycle seat assembly 610. As with the previous embodiments, the bicycle seat assembly 610 is again configured to provide improved support and comfort for the rider of the bicycle.

As illustrated, the bicycle seat assembly 610 is substantially similar to what has been illustrated and described relative to the embodiment shown in FIG. 5. For example, the bicycle seat assembly 610 again includes a seat pan 612 including a horn area 612A, a seating area 612B, and a pair of cutouts 614 that are formed into the seating area 612B; a foam layer 618; an air cell pad 620 including a base 620A and a plurality of air cells 620B that are mounted on and/or secured to the base 620A; and a cover 624, which are substantially similar in design and functionality as what has been described in detail herein above.

However, in this embodiment, the relative positions of the foam layer 618 and the air cell pad 620 have been switched from what was illustrated and described in the embodiment of FIG. 5. More specifically, in this embodiment, the components of the bicycle seat assembly 610 are generally positioned from bottom-to-top, with the seat pan 612 at the bottom, the air cell pad 620 positioned on top of, or over, the seat pan 612, the foam layer 618 positioned on top of, or over, the air cell pad 620, and the cover 624 positioned on top of, or over, the foam layer 618 while also being configured to surround at least a portion of all other components of the bicycle seat assembly 610.

It is further appreciated that this embodiment of the bicycle seat assembly 610 is substantially similar to what was illustrated and described in relation to FIG. 4, but in this embodiment, the bicycle seat assembly 610 is configured without the resilient layer that can be positioned adjacent to and/or adhered to the seat pan 612 and can be positioned to cover the cutouts 614 in the seat pan 612.

Figure 7:
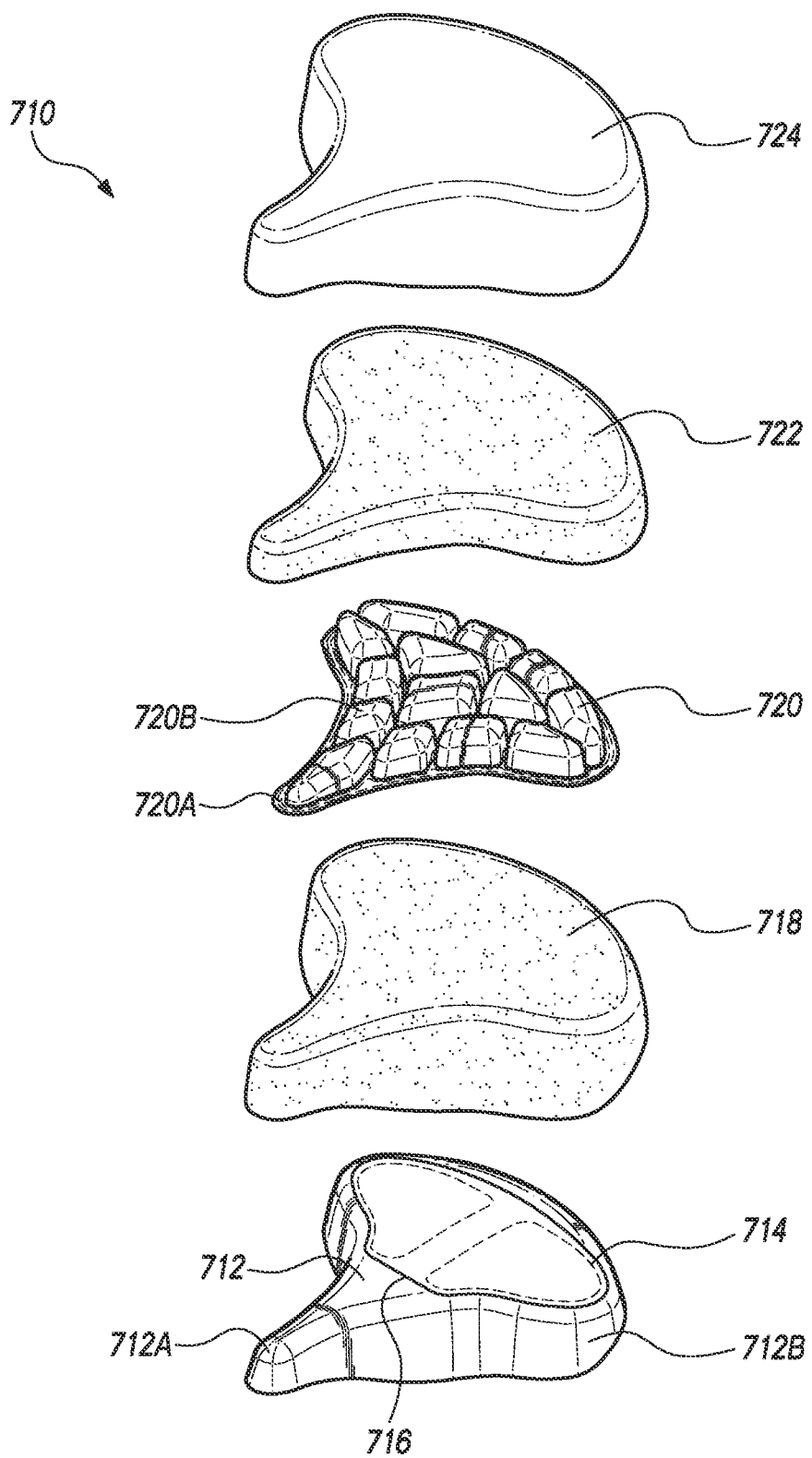
FIG. 7 is a partially exploded view of still yet another embodiment of the bicycle seat assembly.

FIG. 7 is a partially exploded view of still yet another embodiment of the bicycle seat assembly 710. As with the previous embodiments, the bicycle seat assembly 710 is again configured to provide improved support and comfort for the rider of the bicycle.

As illustrated, the bicycle seat assembly 710 is substantially similar to what has been illustrated and described relative to the embodiment shown in FIG. 1B. For example, the bicycle seat assembly 710 again includes a seat pan 712 including a horn area 712A, a seating area 712B, and a pair of cutouts 714 (illustrated in phantom) that are formed into the seating area 712B; a resilient layer 716 that is positioned adjacent to and/or adhered to the seat pan 712 and is configured to cover the cutouts 714 in the seat pan 712; a foam layer 718; an air cell pad 720 including a base 720A and a plurality of air cells 720B that are mounted on and/or secured to the base 720A; a second foam layer 722; and a cover 724, which are substantially similar in design and functionality as what has been described in detail herein above. Additionally, the components of the bicycle seat assembly 710 are again generally positioned from bottom-to-top, with the seat pan 712 at the bottom, the resilient layer 716 being positioned adjacent to and/or adhered to the seat pan 712, the foam layer 718 positioned on top of, or over, the seat pan 712 and the resilient layer 716, the air cell pad 720 positioned on top of, or over, the foam layer 718, the second foam layer 722 positioned on top of, or over, the air cell pad 720, and the cover 724 positioned on top of, or over, the second foam layer 722 while also being configured to surround at least a portion of all other components of the bicycle seat assembly 710.

However, in this embodiment, the size and shape of all of the components of the bicycle seat assembly 710 are slightly different than what is shown in FIG. 1B. For example, the seating area 712B of the seat pan 712, and thus the corresponding areas on the other components, is somewhat wider than in the embodiment illustrated in FIG. 1B.

Additionally, based on the different size and shape of the seat pan 712, the cutouts 714, which generally follow the perimeter of seat pan 712 along each lateral side, have a somewhat more amorphous overall shape. In particular, depending on the perspective taken in looking at the cutouts 714, the cutout 714 on one side can be viewed as somewhat "b"-shaped or somewhat "q"-shaped, while the cutout 714 on the other side can be viewed as somewhat "d"-shaped, or somewhat "p"-shaped. The resilient layer 716, thus, further has a slightly different shape to better match the size and shape of the cutouts 714.

It is appreciated that the different sizes and shapes for all of the components of the bicycle seat assembly 710 are provided to suit the requirements of different sized riders of the bicycle to which the bicycle seal assembly 710 will be attached.

Figure 8A:
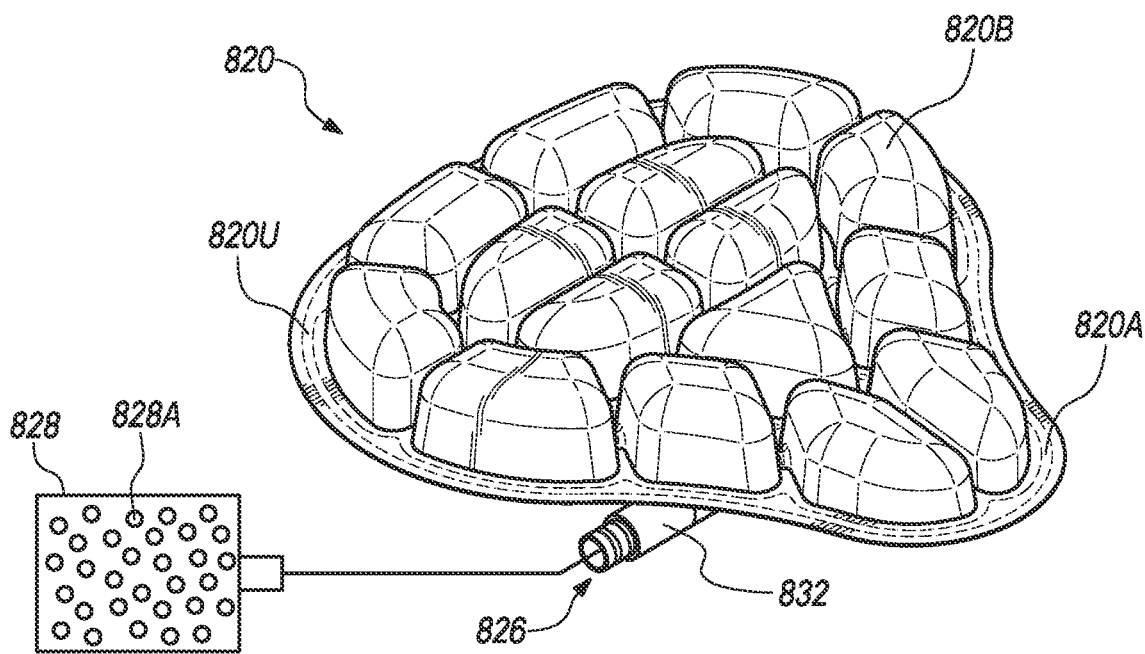
FIG. 8A is a top perspective view of an embodiment of an air cell pad that is usable as part of the bicycle seat assembly.
Figure 8B:
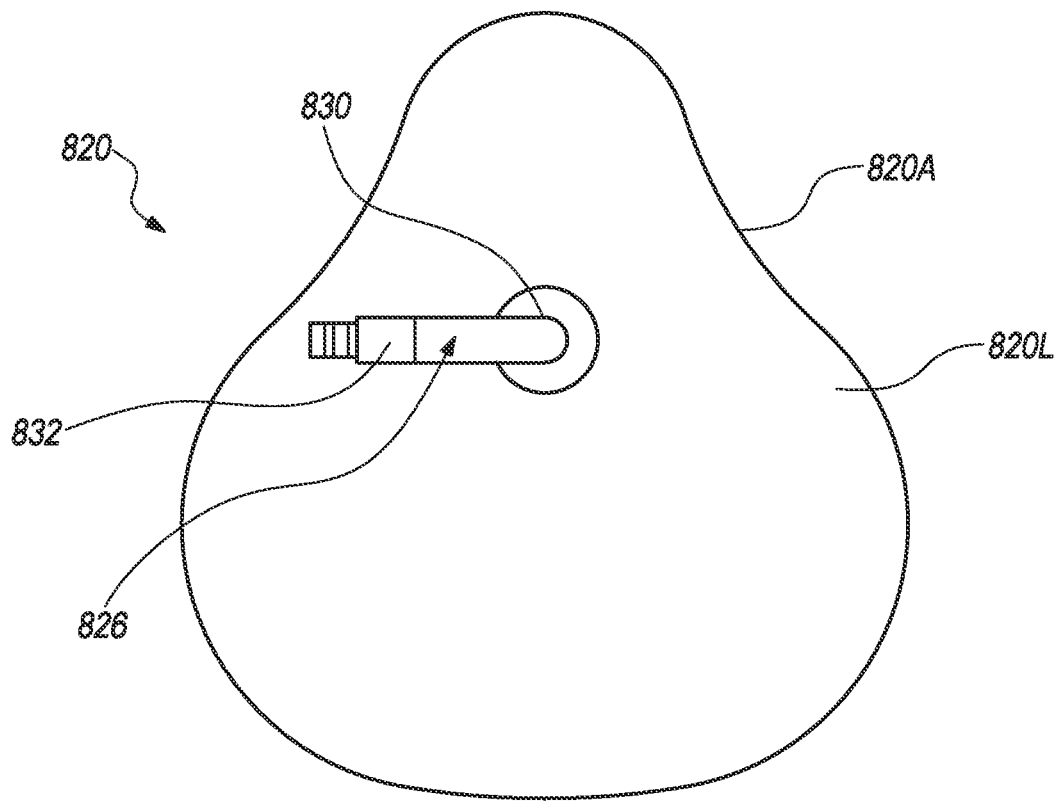
FIG. 8B is a bottom view of the air cell pad illustrated in FIG. 8A.

FIG. 8A is a top perspective view of an embodiment of the air cell pad 820 that is usable as part of the bicycle seat assembly 10 (illustrated in FIG. 1A). Additionally, FIG. 8B is a bottom view of the air cell pad 820 illustrated in FIG. 8A. As with the previous embodiments, the air cell pad 820 is again configured to provide certain resilient support for the rider that is seated on the bicycle seat assembly 10.

The air cell pad 820 is somewhat similar to what has been illustrated and described above in the previous embodiments. For example, as illustrated, the air cell pad 820 again includes a base 820A, and a plurality of upstanding air cells 820B that are mounted on and/or coupled to the base 820A. Additionally, in this embodiment, the air cells 820B are again mounted on and/or coupled to an upper surface 820U of the base 820A to provide the desired resilient support for the rider that is seated on the bicycle seat assembly 10. As with the previous embodiments, the air cells 820B can again be configured to have any suitable size and shape, can be positioned and/or oriented relative to one another in any suitable manner, can be formed from any suitable materials, and can be manufactured in any suitable manner. Moreover, in this embodiment, one or more of the air cells 820B can again be interconnected to one another by fluid flow channels to place the interconnected air cells 820B in fluid communication with one another. With such design, the interconnected air cells 820B again enable equalized pressure among the air cells 820B so as to provide enhanced weight distribution, thus inhibiting the creation of isolated pressure points that can adversely impact the comfort of the rider.

However, in this embodiment, air pressure and/or air volume within the air cells 820B can be selectively varied and/or adjusted as desired. More particularly, as illustrated in this embodiment, the air cell pad 820 further includes a valve assembly 826 such that the air pressure and/or air volume in the air cells 20B can be selectively adjusted as desired to suit the particular requirements of the rider. As shown, the valve assembly 826 includes a valve 832 that provides a conduit for a fluid, such as air, into and out of the air cells 820B; and a valve connector 830 that is coupled to the valve 832, and which effectively connects the valve 832 to the air cells 820B. Stated in another manner, the valve 832 and/or the valve connector 830 are connected in fluid communication with the fluid in the air cells 820B. Alternatively, the valve assembly 826 can include more components or fewer components than what is shown in the Figures.

In this embodiment, the valve connector 830 is coupled to and/or formed into a lower surface 820L (or bottom surface) of the base 820A of the air cell pad 820 in order to provide an inlet/outlet conduit by which the valve 832 can provide fluid (air) into and out of the air cells 820B. Alternatively, the valve connector 830 can be coupled to and/or formed into another portion of the air cell pad 820. For example, in one non-exclusive alternative embodiment, the valve connector 830 can be coupled to and/or formed into the upper surface 820U of the base 820A of the air cell pad 820.

Additionally, the valve connector 830 can be configured to extend away from the air cell pad 820 in any suitable direction. For example, in one embodiment, the valve connector 830 can be configured as a right-angle connector that initially extends outwardly away from the air cell pad 820 and then turns approximately ninety degrees so that is extends substantially parallel to the lower surface 820L of the base 820A. Alternatively, the valve connector 830 can be configured to extend away from the air cell pad 820 in another suitable direction. For example, in one non-exclusive alternative embodiment, the valve connector 830 can extend in a generally straight direction away from the air cell pad 820.

Further, in some embodiments, it is appreciated that the valve connector 830 can be configured to extend in any direction away from the air cell pad 820. More particularly, in such embodiments, the valve connector 830 can be configured to extend in any rotational direction away from the air cell pad 820.

The valve 832 is coupled to the air cells 820B via the valve connector 830, and can further be connected to a fluid source 828, such as an air source, so that a fluid 828A (illustrated as a series of small circles) can be selectively added to and/or removed from the air cells 820B to selectively adjust the air pressure and/or air volume within the air cells 820B. Stated in another manner, the valve connector 830 and/or the valve 832 can be coupled in fluid communication with the fluid source 828 so that the fluid 828A can be selectively added to and/or removed from the air cells 820B to selectively adjust the air pressure and/or air volume within the air cells 820B.

The valve 832 can be coupled to the valve connector 830 in any suitable manner. In one embodiment, the valve 832 can be fixedly coupled to the valve connector 830. Alternatively, in another embodiment, the valve 832 can be removably coupled to the valve connector 830.

When it is desired to add fluid 828A into the air cells 820B and/or remove fluid 828A from the air cells 820B, so as to adjust the air pressure/air volume within the air cells 820B as desired, the valve 832 coupled to the valve connector 830 can be selectively coupled to the fluid source 828. Thus, when the fluid source 828 is thereby coupled in fluid communication into the valve 832, additional volume of fluid 828A can be added into the air cells 820B to increase the air pressure within the air cells 820B, or a volume of fluid 828A can be removed from the air cells 820B to decrease the air pressure within the air cells 820B. Accordingly, with such design, the air cell pad 820 is better able to adjust the particular desired support requirements for the individual rider that is seated on the bicycle seat assembly 10.

It is understood that although a number of different embodiments of the bicycle seat assembly 10 have been illustrated and described herein, one or more features of any one embodiment can be combined with one or more features of one or more of the other embodiments, provided that such combination satisfies the intent of the present invention.

While a number of exemplary aspects and embodiments of the bicycle seat assembly 10 have been shown and disclosed herein above, those of skill in the art will recognize certain modifications, permutations, additions and sub-combinations thereof. It is therefore intended that the bicycle seat assembly 10 shall be interpreted to include all such modifications, permutations, additions and sub-combinations as are within their true spirit and scope, and no limitations are intended to the details of construction or design herein shown.

What is claimed is:

1. A bicycle seat assembly that is configured to be attached to a frame of a bicycle, the bicycle seat assembly comprising:
    a seat pan that is configured to be attached to the frame of the bicycle, the seat pan including a first lateral side, an opposed second lateral side, and a seating area that extends from the first lateral side to the second lateral side toward a rear of the seat pan, the seat pan including a pair of cutouts that are formed spaced apart from one another into an upper surface of the seating area of the seat pan, with one cutout positioned adjacent to each lateral side of the seat pan;
    a foam layer; and
    an air cell pad including a base and a plurality of upstanding air cells that are coupled to the base, each of the plurality of air cells being configured to retain air;
    wherein the air cells are spaced apart from one another.

2. The bicycle seat assembly of claim 1 wherein the air cell pad is positioned between the foam layer and the seat pan.

3. The bicycle seat assembly of claim 1 further comprising a cover that covers at least a portion of the seat pan.

4. A bicycle seat assembly that is configured to be attached to a frame of a bicycle, the bicycle seat assembly comprising:
    a seat pan that is configured to be attached to the frame of the bicycle, the seat pan including a first lateral side, an opposed second lateral side, and a seating area that extends from the first lateral side to the second lateral side toward a rear of the seat pan, the seat pan including a pair of cutouts that are formed spaced apart from one another into an upper surface of the seating area of the seat pan, with one cutout positioned adjacent to each lateral side of the seat pan;
    a foam layer; and
    an air cell pad including a base and a plurality of upstanding air cells that are coupled to the base, each of the plurality of air cells being configured to retain air;
    wherein the foam layer is positioned between the air cell pad and the seat pan.

5. A bicycle seat assembly that is configured to be attached to a frame of a bicycle, the bicycle seat assembly comprising:
    a seat pan that is configured to be attached to the frame of the bicycle, the seat pan including a first lateral side, an opposed second lateral side, and a seating area that extends from the first lateral side to the second lateral side toward a rear of the seat pan, the seat pan including a pair of cutouts that are formed spaced apart from one another into an upper surface of the seating area of the seat pan, with one cutout positioned adjacent to each lateral side of the seat pan;
    a foam layer; and
    an air cell pad including a base and a plurality of upstanding air cells that are coupled to the base, each of the plurality of air cells being configured to retain air;
    wherein when the bicycle seat assembly is in an unstressed condition no structures are positioned within the cutouts.

6. The bicycle seat assembly of claim 5 wherein the air cells are spaced apart from one another.

7. A bicycle seat assembly that is configured to be attached to a frame of a bicycle, the bicycle seat assembly comprising:
    a seat pan that is configured to be attached to the frame of the bicycle, the seat pan including a pair of cutouts that are spaced apart from one another, wherein when the bicycle seat assembly is in an unstressed condition no structures are positioned within the cutouts;
    a foam layer;
    an air cell pad including a base and a plurality of upstanding air cells that are coupled to the base, each of the plurality of air cells being configured to retain air; and
    a resilient layer that is positioned adjacent to the seat pan, the resilient layer extending over the cutouts when the bicycle seat assembly is in the unstressed condition.

8. The bicycle seat assembly of claim 7 wherein when the bicycle seat assembly is in a stressed condition, at least a portion of the resilient layer is configured to extend at least partially into the cutouts.

9. The bicycle seat assembly of claim 7 wherein the resilient layer includes a diaphragm that is positioned adjacent to the seat pan and extends over the pair of cutouts.

10. A bicycle seat assembly that is configured to be attached to a frame of a bicycle, the bicycle seat assembly comprising:
    a seat pan that is configured to be attached to the frame of the bicycle, the seat pan including a first lateral side, an opposed second lateral side, and a seating area that extends from the first lateral side to the second lateral side toward a rear of the seat pan, the seat pan including a pair of cutouts that are formed spaced apart from one another into an upper surface of the seating area of the seat pan, with one cutout positioned adjacent to each lateral side of the seat pan;
    a foam layer; and
    an air cell pad including a base and a plurality of upstanding air cells that are coupled to the base, each of the plurality of air cells being configured to retain air;
    wherein at least two of the air cells are in fluid communication with one another.

11. A bicycle seat assembly that is configured to be attached to a frame of a bicycle, the bicycle seat assembly comprising:
    a seat pan that is configured to be attached to the frame of the bicycle, the seat pan including a first lateral side, an opposed second lateral side, and a seating area that extends from the first lateral side to the second lateral side toward a rear of the seat pan, the seat pan including a pair of cutouts that are formed spaced apart from one another into an upper surface of the seating area of the seat pan, with one cutout positioned adjacent to each lateral side of the seat pan;
    a foam layer; and an air cell pad including a base and a plurality of upstanding air cells that are coupled to the base, each of the plurality of air cells being configured to retain air;

wherein the air cell pad further includes a valve assembly that is selectively coupled in fluid communication to and extends between a fluid source and the plurality of air cells to selectively adjust a volume of fluid within the plurality of air cells.

12. A bicycle seat assembly that is configured to be attached to a frame of a bicycle, the bicycle seat assembly comprising:

a seat pan that is configured to be attached to the frame of the bicycle, the seat pan including a pair of cutouts that are spaced apart from one another;

a foam layer;

an air cell pad including a base and a plurality of upstanding air cells that are coupled to the base, each of the plurality of air cells being configured to retain air; and a second foam layer that is positioned over the air cell pad.

13. A bicycle seat assembly that is configured to be attached to a frame of a bicycle, the bicycle seat assembly comprising:

a seat pan that is configured to be coupled to the frame of the bicycle, the seat pan including a pair of cutouts that are spaced apart from one another; and a resilient layer that is positioned adjacent to the seat pan, the resilient layer including a single-layered, flexible diaphragm;

wherein when the bicycle seat assembly is in an unstressed condition no structures are positioned within the cutouts, and the resilient layer extends over the cutouts; and wherein when the bicycle seat assembly is in a stressed condition, at least a portion of the resilient layer is configured to extend at least partially into at least one of the cutouts.

14. The bicycle seat assembly of claim 13 further comprising a foam layer; and an air cell pad including a base and a plurality of upstanding air cells that are coupled to the base, each of the plurality of air cells being configured to retain air.

15. The bicycle seat assembly of claim 14 wherein the foam layer is positioned between the air cell pad and the seat pan.

16. The bicycle seat assembly of claim 14 wherein the air cell pad is positioned between the foam layer and the seat pan.

17. The bicycle seat assembly of claim 14 wherein the air cells are spaced apart from one another.

18. The bicycle seat assembly of claim 14 wherein at least two of the air cells are in fluid communication with one another.

19. The bicycle seat assembly of claim 14 further comprising a second foam layer that is positioned over the air cell pad.

20. The bicycle seat assembly of claim 14 further comprising a cover that covers at least a portion of the seat pan.

* * * * *